(12) United States Patent
Fujimoto (10) Patent No.: US 12,012,195 B2
(45) Date of Patent: Jun. 18, 2024

(54) OUTBOARD MOTOR, CONTROL METHOD FOR OUTBOARD MOTOR, AND MARINE VESSEL

(71) Applicant: YAMAHA HATSUDOKI KABUSHIKI KAISHA, Iwata (JP)

(72) Inventor: Shimpei Fujimoto, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 539 days.

(21) Appl. No.: 17/221,017

(22) Filed: Apr. 2, 2021

(65) Prior Publication Data

US 2021/0323648 A1  Oct. 21, 2021

(30) Foreign Application Priority Data

Apr. 16, 2020 (JP) ................. 2020-073522

(51) Int. Cl.
| | |
|---|---|
| *B63H 21/20* | (2006.01) |
| *B60L 50/12* | (2019.01) |
| *B60L 50/90* | (2019.01) |
| *B63H 20/00* | (2006.01) |

(52) U.S. Cl.
CPC .............. *B63H 21/20* (2013.01); *B60L 50/12* (2019.02); *B60L 50/90* (2019.02); *B63H 20/00* (2013.01); *B63H 2021/205* (2013.01)

(58) Field of Classification Search
CPC .. B63H 21/20; B63H 20/00; B63H 2021/205; B60L 50/12; B60L 50/90; H02M 7/1626; H02M 1/081; H02J 7/1492
USPC ........................................................ 320/104
See application file for complete search history.

(56) References Cited

U.S. PATENT DOCUMENTS

| | | | | |
|---|---|---|---|---|
| 7,556,547 B2* | 7/2009 | Kaji | ....................... | B63H 21/20 |
| | | | | 440/87 |
| 8,159,180 B2* | 4/2012 | Suzuki | .................. | H02J 7/1492 |
| | | | | 320/148 |
| 8,164,306 B2* | 4/2012 | Mizushima | ............ | B63H 23/24 |
| | | | | 320/128 |
| 8,170,735 B2* | 5/2012 | Kaji | ....................... | B63H 21/21 |
| | | | | 114/144 R |

(Continued)

FOREIGN PATENT DOCUMENTS

| | | |
|---|---|---|
| DE | 102019115799 A1 | 12/2019 |
| EP | 2 824 826 A2 | 1/2015 |

(Continued)

OTHER PUBLICATIONS

Official Communication issued in corresponding European Patent Application No. 21168316.4, dated Sep. 22, 2021.
Office Action in EP21168316.4, dated Jan. 25, 2023, 4 pages.

*Primary Examiner* — M Baye Diao
(74) *Attorney, Agent, or Firm* — Keating & Bennett, LLP (57) ABSTRACT

An outboard motor includes a power converter to convert AC power generated by a generator that generates power by operation of a drive engine into DC power and to supply converted DC power to a plurality of batteries, a voltage detector to detect a voltage value of the DC power converted by the power converter, and a phase angle controller configured or programmed to perform a retarding/advancing control until the voltage value of the DC power becomes equal to or higher than a first preset voltage value, which is higher than a voltage value at a start of the retarding/advancing control.

20 Claims, 6 Drawing Sheets

(56) References Cited

U.S. PATENT DOCUMENTS

| | | | | |
|---|---|---|---|---|
| 8,397,847 | B2* | 3/2013 | Tabata | H02M 7/219 |
| | | | | 180/65.21 |
| 8,814,614 | B2* | 8/2014 | Suzuki | B63H 1/16 |
| | | | | 440/71 |
| 8,992,274 | B1* | 3/2015 | Ward | B63H 21/20 |
| | | | | 440/87 |
| 9,014,909 | B1* | 4/2015 | Dengel | B63H 20/00 |
| | | | | 440/87 |
| 9,227,712 | B2* | 1/2016 | Davis | B63H 20/06 |
| 9,614,397 | B2* | 4/2017 | Sonoda | H02J 7/1492 |
| 9,937,988 | B2* | 4/2018 | Fukuda | B63H 20/00 |
| 10,640,190 | B1* | 5/2020 | Gonring | B63H 25/02 |
| 11,364,874 | B2* | 6/2022 | Takano | G07C 9/00182 |
| 11,731,744 | B2* | 8/2023 | Ikegaya | G07C 5/0808 |
| | | | | 701/21 |
| 2010/0174450 | A1 | 7/2010 | Mizushima | |
| 2010/0237825 | A1 | 9/2010 | Suzuki et al. | |
| 2015/0229159 | A1 | 8/2015 | Sonoda et al. | |
| 2017/0341517 | A1 | 11/2017 | Morita | |
| 2021/0300516 | A1* | 9/2021 | Hayashi | B63H 21/22 |

FOREIGN PATENT DOCUMENTS

| | | | | |
|---|---|---|---|---|
| EP | 2824826 | A2 * | 1/2015 | H02K 11/21 |
| EP | 2946976 | A2 | 11/2015 | |
| EP | 2 824 826 | A3 | 12/2015 | |
| EP | 2007001 | B1 * | 10/2016 | H02J 7/1492 |
| JP | 4990883 | B2 | 8/2012 | |
| JP | 5367382 | B2 | 12/2013 | |

* cited by examiner

OUTBOARD MOTOR, CONTROL METHOD FOR OUTBOARD MOTOR, AND MARINE VESSEL

CROSS REFERENCE TO RELATED APPLICATIONS

This application claims the benefit of priority to Japanese Patent Application No. 2020-073522 filed on Apr. 16, 2020. The entire contents of this application are hereby incorporated herein by reference.

BACKGROUND OF THE INVENTION

1. Field of the Invention

The present invention relates to an outboard motor including a generator, a control method for an outboard motor, and a marine vessel.

2. Description of the Related Art

An outboard motor including a generator, a control method for an outboard motor, and a marine vessel are known in general. Such an outboard motor is disclosed in Japanese Patent No. 5367382, for example.

Japanese Patent No. 5367382 discloses a marine propulsion device (outboard motor) including a generator. The marine propulsion device includes a rectifier circuit, a first storage battery, and a second storage battery. The rectifier circuit converts an alternating current output from the generator into a direct current. The first storage battery is charged by the direct current output from the rectifier circuit and supplies power to a control system that controls the marine propulsion device. The second storage battery is charged by the direct current output from the rectifier circuit and supplies power to equipment of the marine vessel.

A method for retarding control in a battery charger connected between an AC generator and a battery is known in general. Such a method for retarding control is disclosed in Japanese Patent No. 4990883.

Japanese Patent No. 4990883 discloses a method for retarding control in a battery charger including a rectifier circuit and an advancing/retarding control circuit. The rectifier circuit performs a retarding control by retarding the energization timing of a switching element with respect to the phase of an AC output voltage in the AC generator based on a command from the advancing/retarding control circuit. The battery charger includes a current sensor. The battery charger acquires a power generation amount using the current sensor. The advancing/retarding control circuit sets a retarding amount corresponding to a previous power generation amount as a retarding limit value when a current power generation amount, which is a power generation amount after the retarding control, is smaller than the previous power generation amount, which is a power generation amount before the retarding control. The battery charger charges a battery according to the energization timing based on the retarding limit value. That is, in the retarding control method, each time the power generation amount is detected (each time the energization timing is retarded), the current power generation amount is compared with the previous power generation amount, and when the current power generation amount is smaller than the previous power generation amount, the retarding control is terminated.

The retarding control method described in Japanese Patent No. 4990883 is conceivably applied to the marine propulsion device including the generator described in Japanese Patent No. 5367382. However, in the marine propulsion device described in Japanese Patent No. 5367382, a plurality of storage batteries (the first storage battery and the second storage battery) are provided, and thus the combined capacitance of the plurality of storage batteries becomes relatively large. Therefore, even when the energization timing (energization phase angle) of the rectifier circuit connected to the plurality of storage batteries is retarded, a difference of the current power generation amount from the previous power generation amount becomes small. Thus, the difference of the current power generation amount from the previous power generation amount may be smaller than resolution with respect to detection of the power generation amount. In such a case, even when the current power generation amount is slightly increased from the previous power generation amount, the battery charger may erroneously determine that the current power generation amount has been decreased or has not changed from the previous power generation amount due to an error, for example. In such a case, the plurality of storage batteries are charged by power rectified at an energization phase angle corresponding to the previous power generation amount, which is relatively small. Consequently, in the marine propulsion device (outboard motor) including the plurality of storage batteries described in Japanese Patent No. 5367382 to which the retarding control method described in Japanese Patent No. 4990883 is applied, the plurality of storage batteries may not be efficiently charged. Therefore, a marine propulsion device (outboard motor), a control method for an outboard motor, and a marine vessel that efficiently charge a plurality of storage batteries (batteries) even when power is supplied from a generator to the plurality of storage batteries are desired. Furthermore, although the current sensor is used in the retarding control method described in Japanese Patent No. 4990883, it is preferable not to provide a current sensor in an outboard motor charger required to be lightweight and compact. Therefore, a sensorless outboard motor is required, and voltage detection is conceivably substituted for power detection (current detection). The relationship of a voltage to a phase is represented by a quadratic function of a negative proportionality constant and has a local maximum voltage. However, depending on the conditions, the local maximum value and each of the phase value and the proportionality constant at that time change. Therefore, a marine propulsion device (outboard motor), a control method for an outboard motor, and a marine vessel that are able to exceed a local maximum voltage represented by a quadratic function of a negative proportionality constant under any conditions are desired.

SUMMARY OF THE INVENTION

Preferred embodiments of the present invention provide outboard motors, control methods for outboard motors, and marine vessels that each efficiently charge a plurality of batteries even when power is supplied from generators to the plurality of batteries.

An outboard motor according to a preferred embodiment of the present invention includes a drive engine, a generator to generate power by operation of the drive engine, a power converter to convert AC power generated by the generator into DC power and to supply converted DC power to a plurality of batteries, a voltage detector to detect a voltage value of the DC power converted by the power converter, and a phase angle controller configured or programmed to perform a retarding/advancing control to retard or advance an energization phase angle, which is an energization timing with respect to a phase of an output voltage of the AC power generated by the generator. The phase angle controller is configured or programmed to continuously perform the retarding/advancing control until the voltage value of the DC power becomes equal to or higher than a first preset voltage value, which is higher than a voltage value at a start of the retarding/advancing control.

In an outboard motor according to a preferred embodiment of the present invention, the phase angle controller is configured or programmed to continuously perform the retarding/advancing control until the voltage value of the DC power becomes equal to or higher than the first preset voltage value, which is higher than the voltage value at the start of the retarding/advancing control. Accordingly, the retarding/advancing control is continuously performed until the voltage value of the DC power becomes equal to or higher than the first preset voltage value, and thus stopping the retarding/advancing control before the voltage value of the DC power becomes equal to or higher than the first preset voltage value is significantly reduced or prevented. Therefore, when power is supplied to the plurality of batteries, the retarding/advancing control is continuously performed even when the amount of increase in the voltage value of the DC power before and after the retarding/advancing control is smaller than the detection resolution of the voltage value of the DC power. That is, even when it is not detected that the voltage value (power generation amount) of the DC power has increased (the voltage value of the DC power detected this time is higher than the voltage value of the DC power detected last time), the retarding/advancing control is continuously performed. Consequently, as compared with a case in which the retarding/advancing control is terminated before the voltage value of the DC power becomes equal to or higher than the first preset voltage value, the plurality of batteries are efficiently charged even when power is supplied from the generator to the plurality of batteries.

In an outboard motor according to a preferred embodiment of the present invention, the phase angle controller is preferably configured or programmed to perform a control to retard or advance the energization phase angle a plurality of times by a predetermined angle until the voltage value of the DC power becomes equal to or higher than the first preset voltage value. Accordingly, when the energization phase angle is retarded or advanced by the predetermined angle, the energization phase angle is retarded or advanced the plurality of times without terminating the retarding/advancing control before the voltage value of the DC power becomes equal to or higher than the first preset voltage value even when the amount of change in the voltage value of the DC power is relatively small. Consequently, the change in the voltage value of the DC power is relatively small such that the plurality of batteries are efficiently charged as compared with a case in which the retarding/advancing control is terminated. Furthermore, even when the amount of change in the voltage value of the DC power is relatively small, the retarding/advancing control is not terminated, and thus the predetermined angle is set to a relatively small value. Consequently, the energization phase angle is finely adjusted, and thus the energization phase angle is more accurately adjusted to an optimum value.

In an outboard motor according to a preferred embodiment of the present invention, the phase angle controller is preferably configured or programmed to perform a control to perform one of retarding and advancing the energization phase angle when the voltage value of the DC power is lower than the first preset voltage value, and stop at least one of retarding or advancing the energization phase angle based on the voltage value of the DC power becoming equal to or higher than the first preset voltage value and equal to or higher than a second preset voltage value. When one of continuously retarding and advancing an energization phase angle is performed even after the voltage value of DC power becomes equal to or higher than a second preset voltage value, the charging efficiency may decrease due to a decrease in the voltage value of the DC power, or the voltage value of the DC power may increase more than necessary. In this regard, according to a preferred embodiment of the present invention, the at least one of retarding or advancing the energization phase angle is stopped based on the voltage value of the DC power becoming equal to or higher than the second preset voltage value, and thus a decrease in the charging efficiency due to a decrease in the voltage value of the DC power is significantly reduced or prevented. Furthermore, an unnecessary increase in the voltage value of the DC power is significantly reduced or prevented.

In an outboard motor according to a preferred embodiment of the present invention, the phase angle controller is preferably configured or programmed to perform one of retarding and advancing the energization phase angle when the voltage value of the DC power is lower than the first preset voltage value, and to perform the other of retarding and advancing the energization phase angle based on the voltage value of the DC power becoming equal to or higher than the first preset voltage value and equal to or higher than a second preset voltage value. Accordingly, when the voltage value of the DC power becomes equal to or higher than the second preset voltage value, a direction in which the energization phase angle is changed is inverted. Consequently, even when the voltage value of the DC power increases more than necessary, the direction in which the energization phase angle is changed is inverted such that the voltage value of the DC power is closer to an appropriate value (second preset voltage value).

In an outboard motor that performs the other of retarding and advancing the energization phase angle based on the voltage value of the DC power becoming equal to or higher than the second preset voltage value, the phase angle controller is preferably configured or programmed to perform a control to perform again the one of retarding and advancing the energization phase angle based on the voltage value of the DC power becoming lower than the second preset voltage value when performing the other of retarding and advancing the energization phase angle. Accordingly, when the other of retarding and advancing the energization phase angle is performed, the voltage value of the DC power is again increased to the second preset voltage value or higher even when the voltage value of the DC power becomes lower than the second preset voltage value. Consequently, the voltage value of the DC power is maintained at a value near the second preset voltage value.

In an outboard motor that stops the at least one of retarding or advancing the energization phase angle based on the voltage value of the DC power becoming equal to or higher than the second preset voltage value, the second preset voltage value is preferably a charge rated voltage value of the plurality of batteries. Accordingly, the charge rated voltage values of the plurality of batteries are set as the second preset voltage value such that a control is continuously performed to retard or advance the energization phase angle until the voltage value of the DC power becomes equal to or higher than the charge rated voltage values of the plurality of batteries. Consequently, the voltage value of the DC power is more reliably set to the charge rated voltage values or higher of the plurality of batteries. Thus, the plurality of batteries are charged with a more appropriate voltage value.

In an outboard motor according to a preferred embodiment of the present invention, the phase angle controller is preferably configured or programmed to perform a control to stop at least one of retarding or advancing the energization phase angle when the voltage value of the DC power is lower than the first preset voltage value, when one of retarding and advancing the energization phase angle is performed, and when the energization phase angle becomes a first limit phase angle. Accordingly, when the one of retarding and advancing the energization phase angle is performed, retarding or advancing of the energization phase angle beyond the first limit phase angle is significantly reduced or prevented even when the voltage value of the DC power does not become equal to or higher than the first preset voltage value. Consequently, the retarding/advancing control is performed such that excessive retarding or advancing is significantly reduced or prevented even when the voltage value of the DC power does not become equal to or higher than the first preset voltage value. Thus, a decrease in the charging efficiency due to a decrease in the voltage value of the DC power caused by excessive retarding or advancing is significantly reduced or prevented.

In an outboard motor according to a preferred embodiment of the present invention, the phase angle controller is preferably configured or programmed to perform a control to stop one of retarding and advancing the energization phase angle and perform the other of retarding and advancing the energization phase angle when the voltage value of the DC power is lower than the first preset voltage value, when the one of retarding and advancing the energization phase angle is performed, and when the energization phase angle becomes a first limit phase angle. Accordingly, when the one of retarding and advancing the energization phase angle is performed, the other of retarding and advancing the energization phase angle is performed with the first limit phase angle as a turnaround point even when the voltage value of the DC power does not become equal to or higher than the first preset voltage value. Consequently, the energization phase angle is continuously changed while retarding or advancing of the energization phase angle beyond the first limit phase angle is significantly reduced or prevented such that an energization phase angle to improve charging efficiency is provided.

In an outboard motor that stops the one of retarding and advancing the energization phase angle and performs the other of retarding and advancing the energization phase angle when the energization phase angle becomes the first limit phase angle, the phase angle controller is preferably configured or programmed to perform a control to perform again the one of retarding and advancing the energization phase angle when the voltage value of the DC power is lower than the first preset voltage value, when the other of retarding and advancing the energization phase angle is performed, and when the energization phase angle becomes a second limit phase angle. Accordingly, even when the other of retarding and advancing the energization phase angle is performed, a change in the energization phase angle beyond the second limit phase angle is significantly reduced or prevented. Furthermore, even when the other of retarding and advancing the energization phase angle is performed, the one of retarding and advancing the energization phase angle is performed again when the voltage value of the DC power does not become equal to or higher than the first preset voltage value, and thus an energization phase angle to improve charging efficiency is continuously provided.

An outboard motor according to a preferred embodiment of the present invention preferably further includes a relay provided between the generator and at least one of the plurality of batteries to switch between a state in which the at least one of the plurality of batteries is connected to the generator and a state in which the at least one of the plurality of batteries is disconnected from the generator, and the phase angle controller is preferably configured or programmed to continuously perform a control to retard or advance the energization phase angle before and after a number of the batteries connected to the generator is changed by the relay when the voltage value of the DC power is lower than the first preset voltage value. Accordingly, even when the number of the batteries connected to the generator is changed by the operation of the relay, the energization phase angle is continuously retarded or advanced, and thus the plurality of batteries are efficiently charged regardless of a change in the number of the batteries.

A control method for an outboard motor including a generator to generate power by operation of a drive engine according to a preferred embodiment of the present invention includes converting AC power generated by the generator into DC power and supplying converted DC power to a plurality of batteries, detecting a voltage value of the DC power, and performing a retarding/advancing control to retard or advance an energization phase angle, which is an energization timing with respect to a phase of an output voltage of the AC power generated by the generator. The performing of the retarding/advancing control includes continuously performing the retarding/advancing control until the voltage value of the DC power becomes equal to or higher than a first preset voltage value, which is higher than a voltage value at a start of the retarding/advancing control.

In a control method for an outboard motor according to a preferred embodiment of the present invention, similarly to the outboard motor according to preferred embodiments of the present invention described above, even when power is supplied from the generator to the plurality of batteries, the plurality of batteries are efficiently charged.

In a control method for an outboard motor according to a preferred embodiment of the present invention, the performing of the retarding/advancing control preferably includes retarding or advancing the energization phase angle a plurality of times by a predetermined angle until the voltage value of the DC power becomes equal to or higher than the first preset voltage value. Accordingly, when the energization phase angle is retarded or advanced by the predetermined angle, the energization phase angle is retarded or advanced the plurality of times without terminating the retarding/advancing control before the voltage value of the DC power becomes equal to or higher than the first preset voltage value even when the amount of change in the voltage value of the DC power is relatively small. Consequently, the change in the voltage value of the DC power is relatively small such that the plurality of batteries are efficiently charged as compared with a case in which the retarding/advancing control is terminated. Furthermore, even when the amount of change in the voltage value of the DC power is relatively small, the retarding/advancing control is not terminated, and thus the predetermined angle is set to a relatively small value. Consequently, the energization phase angle is finely adjusted, and thus the energization phase angle is more accurately adjusted to an optimum value.

In a control method for an outboard motor according to a preferred embodiment of the present invention, the performing of the retarding/advancing control preferably includes performing one of retarding and advancing the energization phase angle when the voltage value of the DC power is lower than the first preset voltage value, and stopping at least one of retarding or advancing the energization phase angle based on the voltage value of the DC power becoming equal to or higher than the first preset voltage value and equal to or higher than a second preset voltage value. Accordingly, the at least one of retarding or advancing the energization phase angle is stopped based on the voltage value of the DC power becoming equal to or higher than the second preset voltage value, and thus a decrease in the charging efficiency due to a decrease in the voltage value of the DC power is significantly reduced or prevented. Furthermore, an unnecessary increase in the voltage value of the DC power is significantly reduced or prevented.

In a control method for an outboard motor according to a preferred embodiment of the present invention, the performing of the retarding/advancing control preferably includes performing one of retarding and advancing the energization phase angle when the voltage value of the DC power is lower than the first preset voltage value, and performing the other of retarding and advancing the energization phase angle based on the voltage value of the DC power becoming equal to or higher than the first preset voltage value and equal to or higher than a second preset voltage value. Accordingly, when the voltage value of the DC power becomes equal to or higher than the second preset voltage value, a direction in which the energization phase angle is changed is inverted. Consequently, even when the voltage value of the DC power increases more than necessary, the direction in which the energization phase angle is changed is inverted such that the voltage value of the DC power is closer to an appropriate value (second preset voltage value).

In such a case, the performing of the retarding/advancing control preferably includes performing a control to perform again the one of retarding and advancing the energization phase angle based on the voltage value of the DC power becoming lower than the second preset voltage value when the other of retarding and advancing the energization phase angle is performed. Accordingly, when the other of retarding and advancing the energization phase angle is performed, the voltage value of the DC power is again increased to the second preset voltage value or higher even when the voltage value of the DC power becomes lower than the second preset voltage value. Consequently, the voltage value of the DC power is maintained at a value near the second preset voltage value.

In a control method for an outboard motor that stops the at least one of retarding or advancing the energization phase angle based on the voltage value of the DC power becoming equal to or higher than the second preset voltage value, the second preset voltage value is preferably a charge rated voltage value of the plurality of batteries. Accordingly, the charge rated voltage values of the plurality of batteries are set as the second preset voltage value such that a control is continuously performed to retard or advance the energization phase angle until the voltage value of the DC power becomes equal to or higher than the charge rated voltage values of the plurality of batteries. Consequently, the voltage value of the DC power is more reliably set to the charge rated voltage values or higher of the plurality of batteries. Thus, the plurality of batteries are charged with a more appropriate voltage value.

In a control method for an outboard motor according to a preferred embodiment of the present invention, the performing of the retarding/advancing control preferably includes stopping at least one of retarding or advancing the energization phase angle when the voltage value of the DC power is lower than the first preset voltage value, when one of retarding and advancing the energization phase angle is performed, and when the energization phase angle becomes a first limit phase angle. Accordingly, when the one of retarding and advancing the energization phase angle is performed, retarding or advancing of the energization phase angle beyond the first limit phase angle is significantly reduced or prevented even when the voltage value of the DC power does not become equal to or higher than the first preset voltage value. Consequently, the retarding/advancing control is performed such that excessive retarding or advancing is significantly reduced or prevented even when the voltage value of the DC power does not become equal to or higher than the first preset voltage value. Thus, a decrease in the charging efficiency due to a decrease in the voltage value of the DC power caused by excessive retarding or advancing is significantly reduced or prevented.

In a control method for an outboard motor according to a preferred embodiment of the present invention, the performing of the retarding/advancing control preferably includes stopping one of retarding and advancing the energization phase angle and performing the other of retarding and advancing the energization phase angle when the voltage value of the DC power is lower than the first preset voltage value, when the one of retarding and advancing the energization phase angle is performed, and when the energization phase angle becomes a first limit phase angle. Accordingly, when the one of retarding and advancing the energization phase angle is performed, the other of retarding and advancing the energization phase angle is performed with the first limit phase angle as a turnaround point even when the voltage value of the DC power does not become equal to or higher than the first preset voltage value. Consequently, the energization phase angle is continuously changed while retarding or advancing of the energization phase angle beyond the first limit phase angle is significantly reduced or prevented such that an energization phase angle to improve charging efficiency is found.

In such a case, the performing of the retarding/advancing control preferably includes performing again the one of retarding and advancing the energization phase angle when the voltage value of the DC power is lower than the first preset voltage value, when the other of retarding and advancing the energization phase angle is performed, and when the energization phase angle becomes a second limit phase angle. Accordingly, even when the other of retarding and advancing the energization phase angle is performed, a change in the energization phase angle beyond the second limit phase angle is significantly reduced or prevented. Furthermore, even when the other of retarding and advancing the energization phase angle is performed, the one of retarding and advancing the energization phase angle is performed again when the voltage value of the DC power does not become equal to or higher than the first preset voltage value, and thus an energization phase angle to improve charging efficiency is continuously found.

A marine vessel according to a preferred embodiment of the present invention includes a plurality of batteries, and an outboard motor connected to the plurality of batteries. The outboard motor includes a drive engine, a generator to generate power by operation of the drive engine, a power converter to convert AC power generated by the generator into DC power and to supply converted DC power to the plurality of batteries, a voltage detector to detect a voltage value of the DC power converted by the power converter, and a phase angle controller configured or programmed to perform a retarding/advancing control to retard or advance an energization phase angle, which is an energization timing with respect to a phase of an output voltage of the AC power generated by the generator. The phase angle controller is configured or programmed to continuously perform the retarding/advancing control until the voltage value of the DC power becomes equal to or higher than a first preset voltage value, which is higher than a voltage value at a start of the retarding/advancing control.

In a marine vessel according to a preferred embodiment of the present invention, similarly to the outboard motor according to preferred embodiments of the present invention described above and the control method for an outboard motor according to preferred embodiments of the present invention described above, even when power is supplied from the generator to the plurality of batteries, the plurality of batteries are efficiently charged.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of an outboard motor boat 100 according to preferred embodiments of the present invention is now described with reference to FIGS. 1 to 7. In the figures, arrow FWD represents the forward movement direction of the outboard motor boat 100, and arrow BWD represents the reverse movement direction of the outboard motor boat 100. The outboard motor boat 100 is an example of a "marine vessel".

Figure 1:
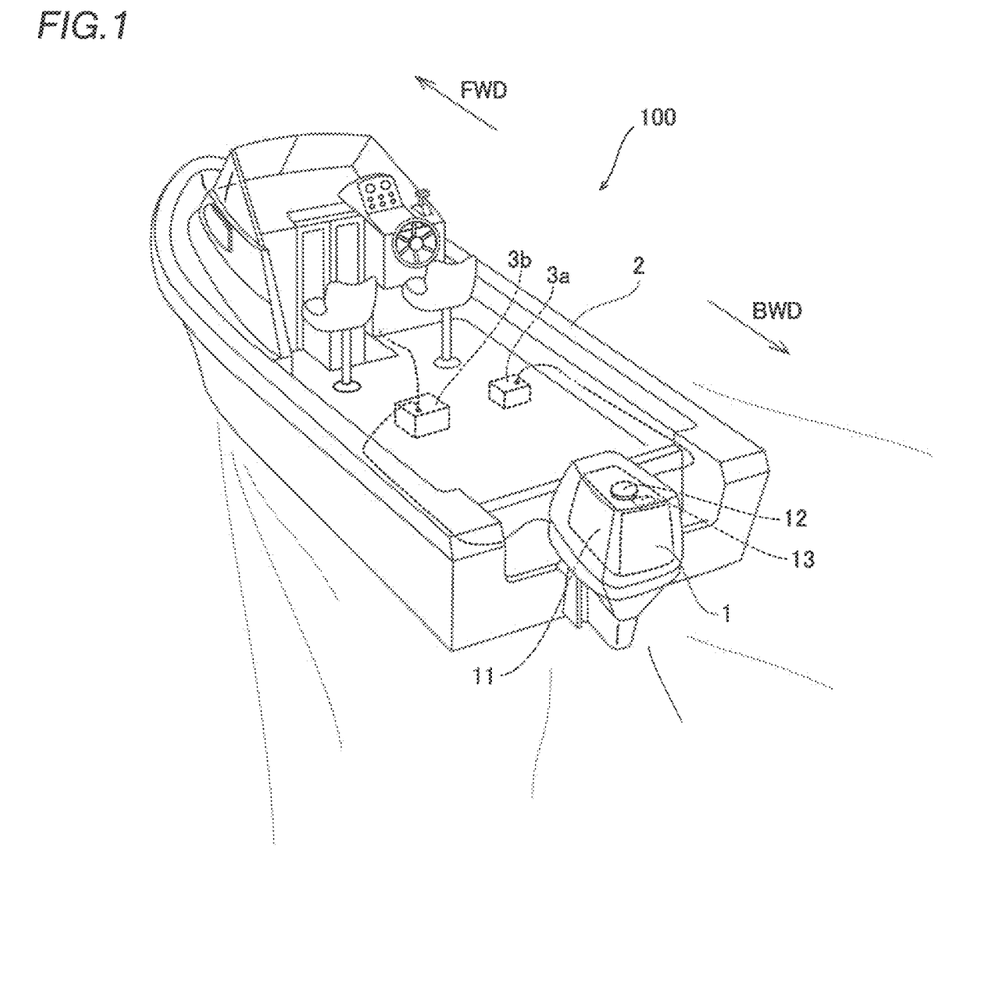
FIG. 1 is a perspective view schematically showing an outboard motor boat including an outboard motor according to a preferred embodiment of the present invention.

As shown in FIG. 1, the outboard motor boat 100 includes an outboard motor 1, a hull 2, a main battery 3a, and a house battery 3b. One outboard motor 1 is provided on the rear of the hull 2, for example. The main battery 3a and the house battery 3b are examples of a "battery".

Figure 2:
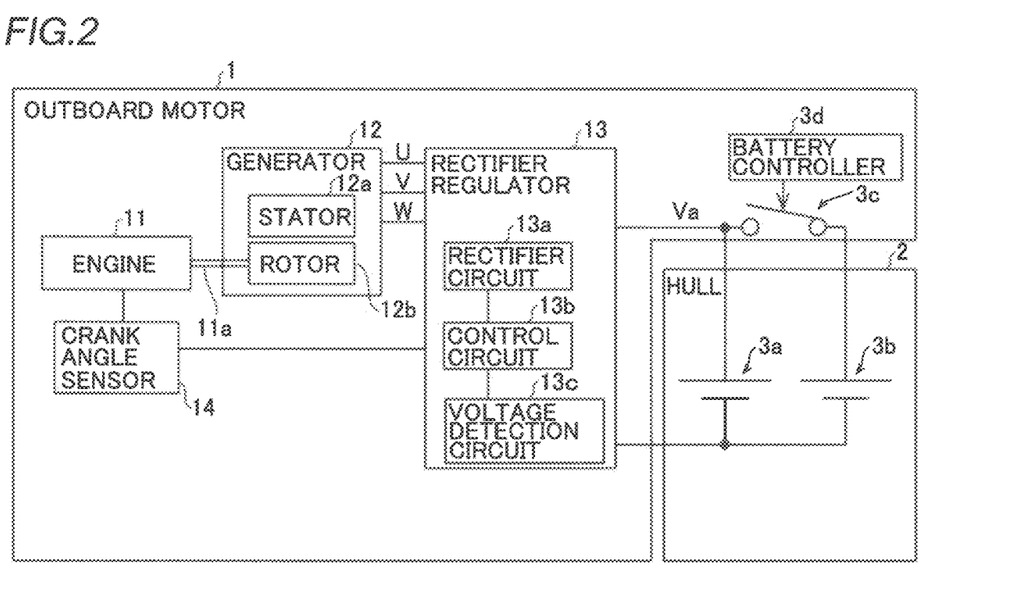
FIG. 2 is a block diagram illustrating the structure of an outboard motor, a main battery, and a house battery according to a preferred embodiment of the present invention.

As shown in FIG. 2, the outboard motor 1 includes an engine 11, a generator 12, a rectifier regulator 13 (hereinafter referred to as a "RECT/REG 13"), and a crank angle sensor 14. The engine 11 is an example of a "drive engine".

The engine 11 is an internal combustion engine, and generates a driving force by burning fuel. The engine 11 rotates a crankshaft 11a with the generated driving force to rotate a propeller of the outboard motor 1. A propulsive force is generated by the rotation of the propeller, and the hull 2 moves. The engine 11 includes a starter motor (not shown). The starter motor of the engine 11 is driven with power supplied from the main battery 3a such that the crankshaft 11a is rotated, and the engine 11 is started.

The engine 11 operates such that the generator 12 generates power. Specifically, the generator 12 includes a stator 12a and a rotor 12b. The stator 12a includes a coil connected to the RECT/REG 13, for example. The rotor 12b includes a permanent magnet. The crankshaft 11a of the engine 11 is rotated such that the rotor 12b rotates with respect to the stator 12a, and an electromotive force is generated. The generator 12 supplies generated AC power to the RECT/REG 13. For example, the generator 12 generates three-phase (U-phase, V-phase, and W-phase) AC power by rotation of the rotor 12b. The rotor 12b also defines and functions as a flywheel for the crankshaft 11a.

The RECT/REG 13 converts the AC power generated by the generator 12 into DC power and adjusts the output voltage value Va of the converted DC power. Specifically, the RECT/REG 13 includes a rectifier circuit 13a, a control circuit 13b, and a voltage detection circuit 13c. The rectifier circuit 13a is an example of a "power converter". The control circuit 13b is an example of a "phase angle controller".

The rectifier circuit 13a converts (rectifies) the AC power generated by the generator 12 into DC power and supplies the converted (rectified) DC power to each of the main battery 3a and the house battery 3b. Specifically, the rectifier circuit 13a includes a plurality of switching elements. The three-phase AC power output from the generator 12 is converted into DC power by switching (repetition of energization and de-energization) of the plurality of switching elements.

The control circuit 13b includes a central processing unit (CPU), for example. The CPU executes a program such that the control circuit 13b performs each control process. The control circuit 13b performs a control (retarding/advancing control) to retard or advance an energization phase angle θ, which is the energization timing with respect to the phase of the output voltage of the AC power generated by the generator 12, as described below.

The voltage detection circuit 13c detects the output voltage value Va of the DC power converted by the rectifier circuit 13a. The voltage detection circuit 13c transmits the detected output voltage value Va to the control circuit 13b.

The crank angle sensor 14 detects the rotation angle (crank angle) of the crankshaft 11a of the engine 11. The crank angle sensor 14 transmits information (signal) on the detected crank angle to the control circuit 13b of the RECT/REG 13.

The main battery 3a supplies power to an engine auxiliary load group (not shown) and the starter motor via cables, for example. The house battery 3b supplies power to an onboard electrical equipment load group (not shown) via a cable, for example.

The outboard motor 1 is located between the generator 12 and the house battery 3b, and includes a relay 3c to switch between a state in which the house battery 3b is connected to the generator 12 and a state in which the house battery 3b is disconnected from the generator 12. The outboard motor 1 includes a battery controller 3d configured or programmed to control the relay 3c to change the number of batteries connected to the generator 12. The battery controller 3d is configured or programmed to perform a control to switch between a state in which the house battery 3b is connected to the generator 12 and a state in which the house battery 3b is disconnected from the generator 12 by operating the relay 3c.

Figure 3:
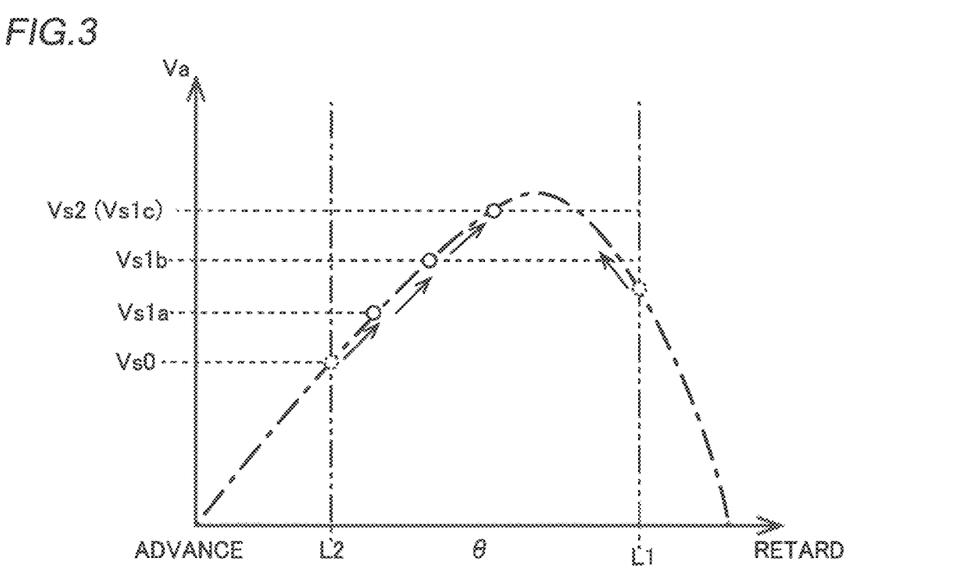
FIG. 3 is a diagram illustrating a retarding/advancing control according to a preferred embodiment of the present invention.

According to preferred embodiments of the present invention, as shown in FIG. 3, the control circuit 13b continuously performs a retarding/advancing control until the output voltage value Va, which is a voltage value of DC power output from the rectifier circuit 13a, becomes equal to or higher than a first preset voltage value Vs1 (Vs1a, Vs1b, or Vs1c), which is higher than a voltage value Vs0 at the start of the retarding/advancing control. Note that FIG. 3 shows an example of characteristics related to charging of the outboard motor 1 in which the horizontal axis represents the energization phase angle θ and the vertical axis represents the output voltage value Va. For example, the control circuit 13b sets a new first preset voltage value Vs1b, which is higher than the first preset voltage value Vs1, when the output voltage value Va becomes the first preset voltage value Vs1a. The control circuit 13b continuously performs a retarding/advancing control until the output voltage value Va becomes equal to or higher than the first preset voltage value Vs1b. Furthermore, the control circuit 13b sets a new first preset voltage value Vs1c, which is higher than the first preset voltage value Vs1b, when the output voltage value Va becomes the first preset voltage value Vs1b. The control circuit 13b continuously performs a retarding/advancing control until the output voltage value Va becomes equal to or higher than the first preset voltage value Vs1c. According to preferred embodiments of the present invention, the first preset voltage values Vs1a to Vs1c are simply described as a "first preset voltage value Vs1" when they are not distinguished from each other.

The control circuit 13b continuously performs a retarding/advancing control until the output voltage value Va becomes equal to or higher than a second preset voltage value Vs2. According to preferred embodiments of the present invention, the charge rated voltage values of the main battery 3a and the house battery 3b are set as the second preset voltage value Vs2. That is, the control circuit 13b continuously performs a control to retard or advance the energization phase angle θ until the output voltage value Va becomes equal to or higher than the charge rated voltage values of the main battery 3a and the house battery 3b. FIG. 3 shows an example in which the first preset voltage value Vs1c is equal to the second preset voltage value Vs2, but the first preset voltage value Vs1c and the second preset voltage value Vs2 may be different from each other.

Specifically, the control circuit 13b acquires information on the crank angle from the crank angle sensor 14. The crankshaft 11a and the rotor 12b are rotating in synchronization with each other, and thus the control circuit 13b performs a control to retard or advance the energization phase angle θ, using the phase of the crank angle as the phase of the output voltage of the AC power generated by the generator 12. The rectifier circuit 13a acquires the phase of the output voltage of the AC power generated by the generator 12 based on the information (signal) on the crank angle. That is, the control circuit 13b performs a control to retard or advance the energization phase angle θ with reference to the phase of the crank angle.

Figure 4:
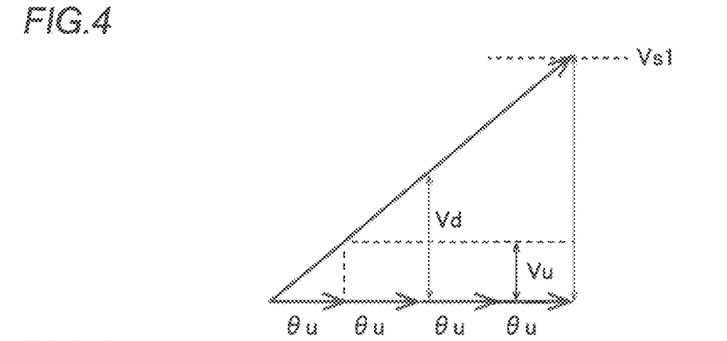
FIG. 4 is a diagram illustrating the relationship between a unit angle and detection resolution according to a preferred embodiment of the present invention.

As shown in FIG. 4, the control circuit 13b performs a control to retard or advance the energization phase angle θ a plurality of times by a unit angle θu until the output voltage value Va becomes equal to or higher than the first preset voltage value Vs1. The amount of increase in the output voltage value Va is defined as Vu when the angle is retarded once by the unit angle θu. In such a case, when the detection resolution of the voltage value of the voltage detection circuit 13c is Vd larger than Vu, the voltage detection circuit 13c is not able to detect that the output voltage value Va is increased by Vu. The detection resolution refers to a minimum voltage width that is able to be detected by the voltage detection circuit 13c. Therefore, according to preferred embodiments of the present invention, the control circuit 13b continuously performs a control to retard the energization phase angle θ the plurality of times by the unit angle θu until the output voltage value Va becomes equal to or higher than the set voltage value Vs. Thus, the output voltage value Va increases by as much as the plurality of times Vu (Vu×number of times) such that a voltage value obtained by multiplying Vu by the number of times the angle is retarded becomes larger than the detection resolution Vd. Note that FIG. 4 shows an example in which the output voltage value Va is retarded four times by the unit angle θu to become the first preset voltage value Vs1, but the present invention is not limited to this example. The unit angle θu is an example of a "predetermined angle".

Figure 5:
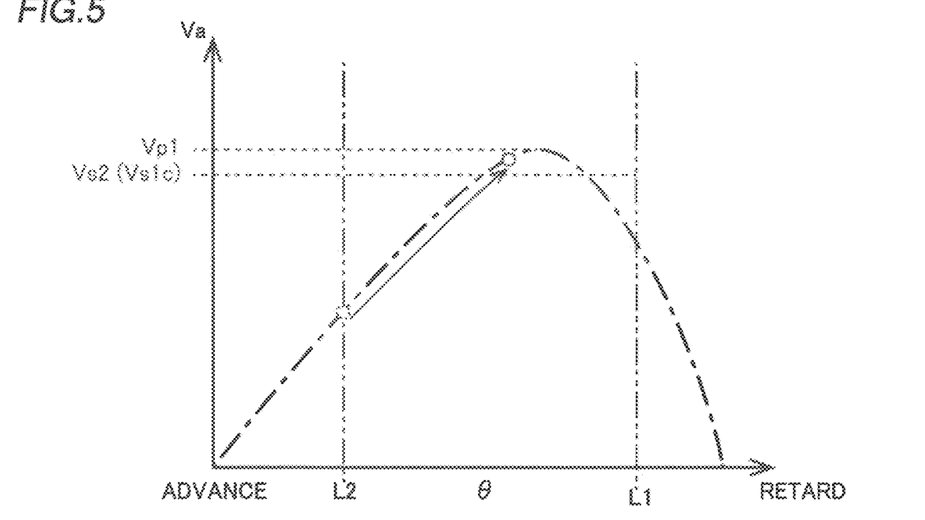
FIG. 5 is a diagram illustrating retarding an energization phase angle according to a preferred embodiment of the present invention.
Figure 6:
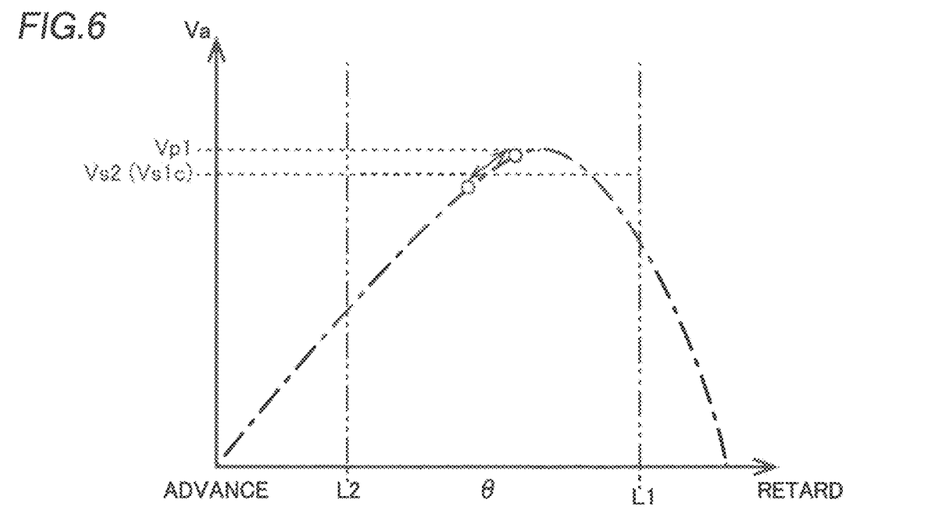
FIG. 6 is a diagram illustrating a retarding/advancing control when an output voltage value is less than a set voltage value and a retarding/advancing control when the output voltage value is equal to or higher than the set voltage value according to a preferred embodiment of the present invention.

As shown in FIG. 5, according to preferred embodiments of the present invention, the control circuit 13b performs one of retarding and advancing the energization phase angle θ when the output voltage value Va is lower than the first preset voltage value Vs1 (second preset voltage value Vs2), and stops at least one of retarding or advancing the energization phase angle θ based on the output voltage value Va becoming equal to or higher than the first preset voltage value Vs1c and equal to or higher than the second preset voltage value Vs2. According to preferred embodiments of the present invention, the control circuit 13b stops one of retarding and advancing the energization phase angle θ and performs the other of retarding and advancing the energization phase angle θ based on the output voltage value Va becoming equal to or higher than the first preset voltage value Vs1c and equal to or higher than the second preset voltage value Vs2. As shown in FIG. 6, when performing the other of retarding and advancing the energization phase angle θ, the control circuit 13b performs a control to perform again one of retarding and advancing the energization phase angle θ based on the output voltage value Va becoming less than the second preset voltage value Vs2.

Specifically, as shown in FIG. 5, the control circuit 13b first retards the energization phase angle θ when the output voltage value Va is lower than the second preset voltage value Vs2. For example, the energization phase angle θ is retarded from a limit phase angle L2 described below. Then, the energization phase angle θ is retarded such that the output voltage value Va increases to become equal to or higher than the second preset voltage value Vs2. In such a case, as shown in FIG. 6, the control circuit 13b stops retarding the energization phase angle θ and advances the energization phase angle θ. That is, the control circuit 13b inverts a direction in which the energization phase angle θ is changed. Thus, the output voltage value Va decreases. Then, the control circuit 13b stops advancing the energization phase angle θ and retards the energization phase angle θ again based on the output voltage value Va becoming lower than the second preset voltage value Vs2. That is, the control circuit 13b repeatedly retards and advances the energization phase angle θ based on the detected output voltage value Va such that the output voltage value Va approaches the second preset voltage value Vs2. Thus, the output voltage value Va becomes a value near the second preset voltage value Vs2.

Figure 7:
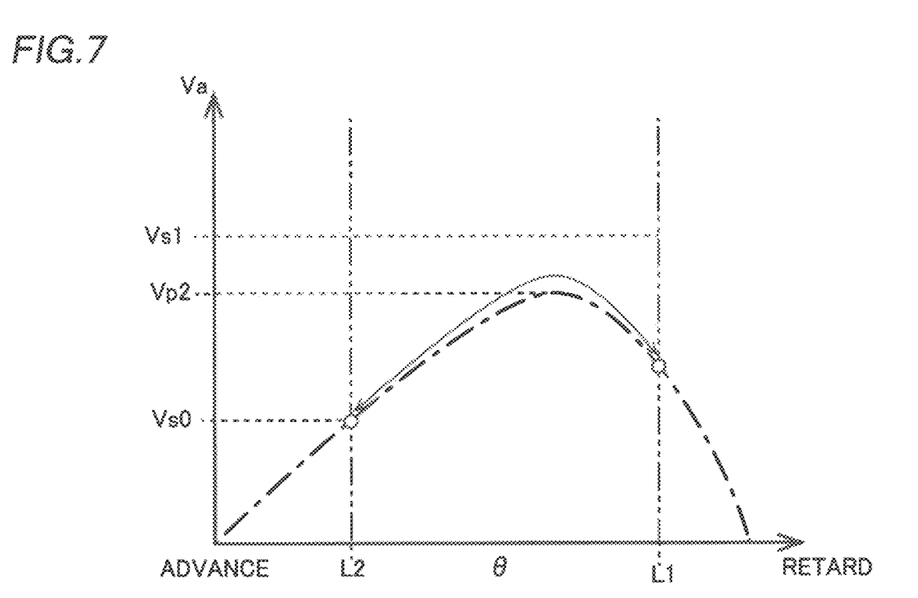
FIG. 7 is a diagram illustrating a limit phase angle according to a preferred embodiment of the present invention.

As shown in FIG. 7, the control circuit 13b stops at least one of retarding or advancing the energization phase angle θ when the output voltage value Va is lower than the first preset voltage value Vs1, when one of retarding and advancing the energization phase angle θ is performed, and when the energization phase angle θ becomes a limit phase angle L1. According to preferred embodiments of the present invention, the control circuit 13b stops one of retarding and advancing the energization phase angle θ. Then, the control circuit 13b performs a control to perform the other of retarding and advancing the energization phase angle θ. Furthermore, the control circuit 13b performs a control to perform again one of retarding and advancing the energization phase angle θ when the output voltage value Va is lower than the first preset voltage value Vs1, when the other of retarding and advancing the energization phase angle θ is performed, and when the energization phase angle θ becomes the limit phase angle L2. The limit phase angle L2 is a value (more advanced value) different from the limit phase angle L1.

For example, when the output voltage value Va is lower than the first preset voltage value Vs1, the control circuit 13b first retards the energization phase angle θ. Then, the energization phase angle θ is retarded such that the output voltage value Va changes, but the output voltage value Va may not become equal to or higher than the first preset voltage value Vs1, as shown in FIG. 7. In such a case, the control circuit 13b continues to retard the energization phase angle θ. Then, when the energization phase angle θ becomes the limit phase angle L1, the control circuit 13b stops retarding the energization phase angle θ and advances the energization phase angle θ. That is, the control circuit 13b inverts a direction in which the energization phase angle θ is changed when the energization phase angle θ becomes the limit phase angle L1. Then, the energization phase angle θ is advanced such that the output voltage value Va changes, but the control circuit 13b continues to advance the energization phase angle θ when the output voltage value Va does not become equal to or higher than the first preset voltage value Vs1. Then, when the energization phase angle θ becomes the limit phase angle L2, the control circuit 13b stops advancing the energization phase angle θ and retards the energization phase angle θ again. Thus, when the output voltage value Va does not become equal to or higher than the first preset voltage value Vs1, the energization phase angle θ is repeatedly retarded and advanced within a range between the limit phase angle L1 and the limit phase angle L2.

The control circuit 13b continuously performs a control to retard or advance the energization phase angle θ before and after the number of batteries connected to the generator 12 is changed by the relay 3c (see FIG. 2) when the output voltage value Va is lower than the first preset voltage value Vs1. For example, when the relay 3c is open, only the main battery 3a is connected to the generator 12, and when the relay 3c is closed, the main battery 3a and the house battery 3b are connected to the generator 12.

Figure 8:
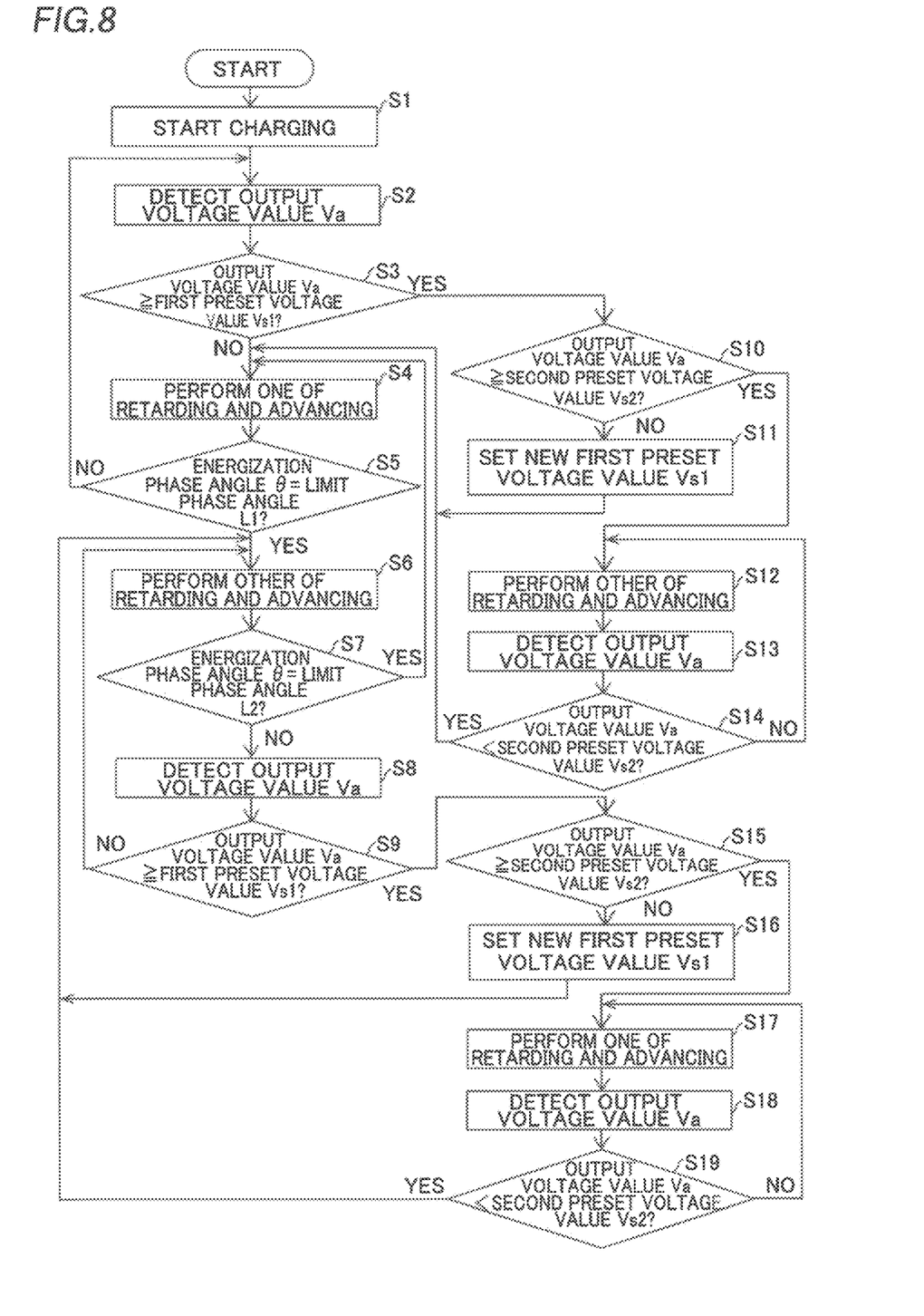
FIG. 8 is a flowchart showing a control process of an outboard motor according to a preferred embodiment of the present invention.

A control method for the outboard motor 1 according to preferred embodiments of the present invention is now described with reference to FIG. 8. FIG. 8 shows a flowchart of a control process of the outboard motor 1.

In step S1, the AC power generated by the generator is converted into DC power, and the converted DC power is supplied to a plurality of batteries. That is, charging of the plurality of batteries is started. Then, the process advances to step S2.

In step S2, the output voltage value Va, which is the voltage value of the DC power, is detected. Then, the process advances to step S3.

In step S3, it is determined whether or not the output voltage value Va is equal to or higher than the first preset voltage value Vs1. When the output voltage value Va is equal to or higher than the first preset voltage value Vs1, the process advances to step S10, and when the output voltage value Va is lower than the first preset voltage value Vs1, the process advances to step S4.

In step S4, one of retarding and advancing is performed. For example, the energization phase angle θ is retarded by the unit angle θu. Then, the process advances to step S5. That is, according to preferred embodiments of the present invention, the energization phase angle θ is retarded until the output voltage value Va becomes equal to or higher than the first preset voltage value Vs1. When the operation in step S4 is performed a plurality of times, the energization phase angle θ is retarded the plurality of times by the unit angle θu until the output voltage value Va becomes equal to or higher than the first preset voltage value Vs1.

In step S5, it is determined whether or not the retarded energization phase angle θ is the limit phase angle L1. When the retarded energization phase angle θ is not the limit phase angle L1, the process returns to step S2, and when the retarded energization phase angle θ is the limit phase angle L1, the process advances to step S6.

In step S6, the other of retarding and advancing is performed. For example, the energization phase angle θ is advanced by the unit angle θu. That is, when the output voltage value Va is lower than the first preset voltage value Vs1, when the energization phase angle θ is retarded, and when the energization phase angle θ becomes the limit phase angle L1, retarding of the energization phase angle θ is stopped, and the energization phase angle θ is advanced. Then, the process advances to step S7.

In step S7, it is determined whether or not the advanced energization phase angle θ is the limit phase angle L2. When the advanced energization phase angle θ is not the limit phase angle L2, the process advances to step S8, and when the advanced energization phase angle θ is the limit phase angle L2, the process returns to step S4.

In step S8, the output voltage value Va, which is the voltage value of the DC power, is detected. Then, the process advances to step S9.

In step S9, it is determined whether or not the output voltage value Va is equal to or higher than the first preset voltage value Vs1. When the output voltage value Va is equal to or higher than the first preset voltage value Vs1, the process advances to step S15, and when the output voltage value Va is lower than the first preset voltage value Vs1, the process returns to step S6.

In step S10 to which the process advances when the output voltage value Va becomes equal to or higher than the first preset voltage value Vs1 in step S3, it is determined whether or not the output voltage value Va is equal to or higher than the second preset voltage value Vs2. When the output voltage value Va is equal to or higher than the second preset voltage value Vs2, the process advances to step S12, and when the output voltage value Va is lower than the second preset voltage value Vs2, the process advances to step S11.

In step S11, a new first preset voltage value Vs1 is set. Then, the process advances to step S4.

In step S12, the other of retarding and advancing is performed. For example, the energization phase angle θ is advanced by the unit angle θu. Then, the process advances to step S13.

In step S13, the output voltage value Va, which is the voltage value of the DC power, is detected. Then, the process advances to step S14.

In step S14, it is determined whether or not the output voltage value Va is lower than the second preset voltage value Vs2. When the output voltage value Va is lower than the second preset voltage value Vs2, the process advances to step S4. That is, when the energization phase angle θ is advanced, the energization phase angle θ is retarded based on the output voltage value Va becoming lower than the second preset voltage value Vs2. When the output voltage value Va is equal to or higher than the second preset voltage value Vs2, the process returns to step S12.

In step S15 to which the process advances when the output voltage value Va becomes equal to or higher than the first preset voltage value Vs1 in step S9, it is determined whether or not the output voltage value Va is equal to or higher than the second preset voltage value Vs2. When the output voltage value Va is equal to or higher than the second preset voltage value Vs2, the process advances to step S17, and when the output voltage value Va is lower than the second preset voltage value Vs2, the process advances to step S16.

In step S16, a new first preset voltage value Vs1 is set. Then, the process advances to step S6.

In step S17, one of retarding and advancing is performed. For example, the energization phase angle θ is retarded by the unit angle θu. Then, the process advances to step S18.

In step S18, the output voltage value Va, which is the voltage value of the DC power, is detected. Then, the process advances to step S19.

In step S19, it is determined whether or not the output voltage value Va is lower than the second preset voltage value Vs2. When the output voltage value Va is lower than the second preset voltage value Vs2, the process returns to step S6. When the output voltage value Va is equal to or higher than the second preset voltage value Vs2, the process returns to step S17.

In step S1 to step S19, when the output voltage value Va is lower than the first preset voltage value Vs1, the energization phase angle θ is continuously retarded or advanced before and after the number of batteries connected to the generator 12 is changed by the relay 3c. That is, when a state in which the house battery 3b is disconnected from the generator 12 is switched to a state in which the house battery 3b is energized by the relay 3c while the control process described above is being performed, and when a state in which the house battery 3b is energized is switched to a state in which the house battery 3b is disconnected from the generator 12 by the relay 3c while the control process described above is being performed, the operations in step S1 to step S19 described above are continuously performed.

Figure 9:
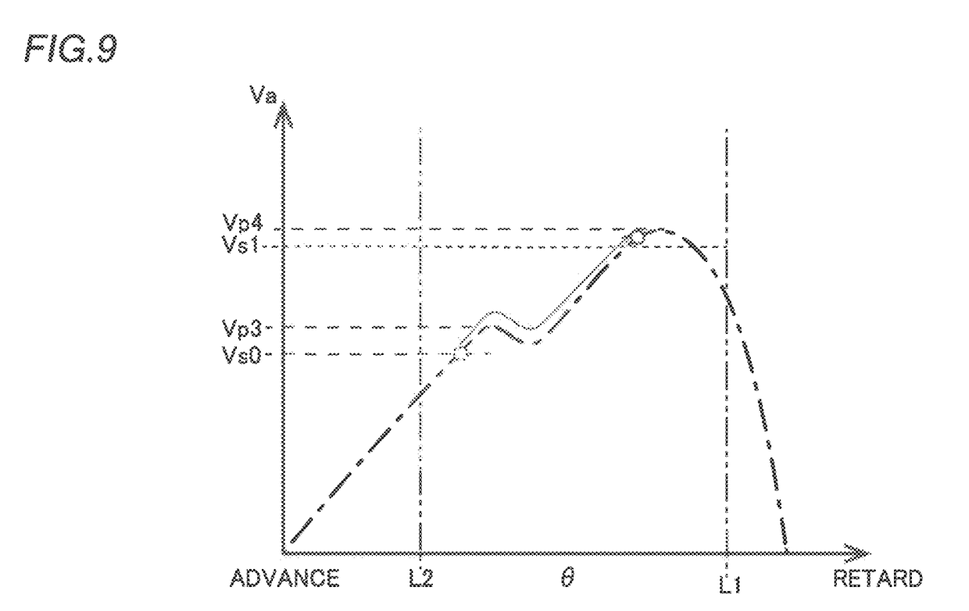
FIG. 9 is a diagram illustrating an example of a retarding/advancing control when there are two peak values in an output voltage value according to a preferred embodiment of the present invention.

A specific example of the control method for the outboard motor 1 according to preferred embodiments of the present invention is now described with reference to FIGS. 5 to 7 and 9. FIGS. 5 and 6 show an example in which the peak value Vp1 of the output voltage value Va exceeds the first preset voltage value Vs1 when the retarding/advancing control is performed. FIG. 7 shows an example in which the peak value Vp2 of the output voltage value Va is lower than the first preset voltage value Vs1 when the retarding/advancing control is performed. FIG. 9 shows an example in which two peak values (peaks) (Vp3 and Vp4) exist in the output voltage value Va when the retarding/advancing control is performed. It is assumed that Vp3 of the two peak values is lower than the first preset voltage value Vs1, and Vp4 of the two peak values is equal to or higher than the first preset voltage value Vs1.

In the example of FIG. 5, first, the energization phase angle θ is continuously retarded until the output voltage value Va becomes equal to or higher than the first preset voltage value Vs1c (second preset voltage value Vs2). Then, as shown in FIG. 6, the energization phase angle θ is advanced when the output voltage value Va becomes equal to or higher than the second preset voltage value Vs2. Then, the energization phase angle θ is continuously retarded when the output voltage value Va becomes lower than the second preset voltage value Vs2. Thus, the output voltage value Va is adjusted to a value near the second preset voltage value Vs2.

In the example of FIG. 7, first, the energization phase angle θ is retarded. Then, the energization phase angle θ is advanced according to the energization phase angle θ becoming the limit phase angle L1. Then, the energization phase angle θ is retarded according to the energization phase angle θ becoming the limit phase angle L2. Thus, the energization phase angle θ is scanned so as to reciprocate between the limit phase angle L1 and the limit phase angle L2. Then, when the state of FIG. 7 changes to the state of FIG. 5, 6, or 9 due to a change in the magnitude of the load in the outboard motor 1, the output voltage value Va is adjusted to a value near the second preset voltage value Vs2.

In the example of FIG. 9, the energization phase angle θ is continuously retarded until the energization phase angle θ becomes equal to or higher than the first preset voltage value Vs1. That is, the energization phase angle θ is continuously retarded even above the peak value Vp3. Then, when the output voltage value Va becomes equal to or higher than the first preset voltage value Vs1 (near the peak value Vp4), the energization phase angle θ is advanced. Then, when the output voltage value Va becomes lower than the set voltage value Vs, the energization phase angle θ is continuously retarded. Thus, the output voltage value Va is adjusted to a value near the set voltage value Vs (near the peak value Vp4).

In the structure according to the various preferred embodiments of the present invention described above, the following advantageous effects are achieved.

According to a preferred embodiment of the present invention, the control circuit 13b continuously performs the retarding/advancing control until the output voltage value Va becomes equal to or higher than the first preset voltage value Vs1. Accordingly, the retarding/advancing control is continuously performed until the output voltage value Va becomes equal to or higher than the first preset voltage value Vs1, and thus stopping the retarding/advancing control before the output voltage value Va becomes equal to or higher than the first preset voltage value Vs1 is significantly reduced or prevented. Therefore, when power is supplied to the main battery 3*a* and the house battery 3*b*, the retarding/advancing control is continuously performed even when the amount of increase in the output voltage value Va before and after the retarding/advancing control is smaller than the detection resolution Vd of the output voltage value Va. That is, even when it is not detected that the output voltage value Va (power generation amount) has increased (the output voltage value Va detected this time is higher than the output voltage value Va detected last time), the retarding/advancing control is continuously performed. Consequently, as compared with a case in which the retarding/advancing control is terminated before the output voltage value Va becomes equal to or higher than the first preset voltage value Vs1Vs, the main battery 3*a* and the house battery 3*b* are efficiently charged even when power is supplied from the generator 12 to the main battery 3*a* and the house battery 3*b*.

According to a preferred embodiment of the present invention, the control circuit 13*b* performs a control to retard or advance the energization phase angle θ a plurality of times by the unit angle θu until the output voltage value Va becomes equal to or higher than the first preset voltage value Vs1. Accordingly, when the energization phase angle θ is retarded or advanced by the unit angle θu, the energization phase angle θ is retarded or advanced the plurality of times without terminating the retarding/advancing control before the output voltage value Va becomes equal to or higher than the first preset voltage value Vs1 even when the amount of change in the output voltage value Va is relatively small. Consequently, the change in the output voltage value Va is relatively small such that the main battery 3*a* and the house battery 3*b* are efficiently charged as compared with a case in which the retarding/advancing control is terminated. Furthermore, even when the amount of change in the output voltage value Va is relatively small, the retarding/advancing control is not terminated, and thus the unit angle θu is set to a relatively small value. Consequently, the energization phase angle θ is finely adjusted, and thus the energization phase angle θ is more accurately adjusted to an optimum value.

According to a preferred embodiment of the present invention, the control circuit 13*b* performs a control to perform one of retarding and advancing the energization phase angle θ when the output voltage value Va is lower than the first preset voltage value Vs1, and to stop at least one of retarding or advancing the energization phase angle θ based on the output voltage value Va becoming equal to or higher than the first preset voltage value Vs1 and equal to or higher than the second preset voltage value Vs2. Accordingly, at least one of retarding or advancing the energization phase angle θ is stopped based on the output voltage value Va becoming equal to or higher than the second preset voltage value Vs2, and thus a decrease in the charging efficiency due to a decrease in the output voltage value Va is significantly reduced or prevented. Furthermore, an unnecessary increase in the output voltage value Va is significantly reduced or prevented.

According to a preferred embodiment of the present invention, the control circuit 13*b* performs one of retarding and advancing the energization phase angle θ when the output voltage value Va is lower than the first preset voltage value Vs1, and performs the other of retarding and advancing the energization phase angle θ based on the output voltage value Va becoming equal to or higher than the first preset voltage value Vs1 and equal to or higher than the second preset voltage value Vs2. Accordingly, when the output voltage value Va becomes equal to or higher than the second preset voltage value Vs2, the direction in which the energization phase angle θ is changed is inverted. Consequently, even when the output voltage value Va increases more than necessary, the direction in which the energization phase angle θ is changed is inverted such that the output voltage value Va is closer to an appropriate value (second preset voltage value Vs2).

According to a preferred embodiment of the present invention, the control circuit 13*b* performs a control to perform again one of retarding and advancing the energization phase angle θ based on the output voltage value Va becoming lower than the second preset voltage value Vs2 when performing the other of retarding and advancing the energization phase angle θ. Accordingly, when the other of retarding and advancing the energization phase angle θ is performed, the output voltage value Va is again increased to the second preset voltage value Vs2 or higher even when the output voltage value Va becomes lower than the second preset voltage value Vs2. Consequently, the output voltage value Va is maintained at a value near the second preset voltage value Vs2.

According to a preferred embodiment of the present invention, the second preset voltage value Vs2 is the charge rated voltage values of the main battery 3*a* and the house battery 3*b*. Accordingly, the charge rated voltage values of the main battery 3*a* and the house battery 3*b* are set as the second preset voltage value Vs2 such that a control is continuously performed to retard or advance the energization phase angle θ until the output voltage value Va becomes equal to or higher than the charge rated voltage values of the main battery 3*a* and the house battery 3*b*. Consequently, the output voltage value Va is more reliably set to the charge rated voltage values or higher of the main battery 3*a* and the house battery 3*b*. Thus, the main battery 3*a* and the house battery 3*b* are charged with a more appropriate voltage value.

According to a preferred embodiment of the present invention, the control circuit 13*b* performs a control to stop retarding the energization phase angle θ when the output voltage value Va is lower than the first preset voltage value Vs1, when the energization phase angle θ is retarded, and when the energization phase angle θ becomes the limit phase angle L1. Accordingly, when the energization phase angle θ is retarded, retarding of the energization phase angle θ beyond the limit phase angle L1 is significantly reduced or prevented even when the output voltage value Va does not become equal to or higher than the first preset voltage value Vs1. Consequently, the retarding/advancing control is performed such that excessive retarding is significantly reduced or prevented even when the output voltage value Va does not become equal to or higher than the first preset voltage value Vs1. Thus, a decrease in the charging efficiency due to a decrease in the output voltage value Va caused by excessive retarding is significantly reduced or prevented.

According to a preferred embodiment of the present invention, the control circuit 13*b* performs a control to stop retarding the energization phase angle θ and advance the energization phase angle θ when the output voltage value Va is lower than the first preset voltage value Vs1, when the energization phase angle θ is retarded, and when the energization phase angle θ becomes the limit phase angle L1. Accordingly, when the energization phase angle θ is retarded, the energization phase angle θ is advanced with the limit phase angle L1 as a turnaround point even when the output voltage value Va does not become equal to or higher than the first preset voltage value Vs1. Consequently, the energization phase angle θ is continuously changed while retarding of the energization phase angle θ beyond the limit phase angle L1 is significantly reduced or prevented such that an energization phase angle θ for better charging efficiency is provided.

According to a preferred embodiment of the present invention, the control circuit 13b performs a control to retard the energization phase angle θ again when the output voltage value Va is lower than the first preset voltage value Vs1, when the energization phase angle θ is advanced, and when the energization phase angle θ becomes the limit phase angle L2. Accordingly, even when the energization phase angle θ is advanced, a change in the energization phase angle θ beyond the limit phase angle L2 is significantly reduced or prevented. Furthermore, even when the energization phase angle θ is advanced, the energization phase angle θ is retarded again when the output voltage value Va does not become equal to or higher than the first preset voltage value Vs1, and thus an energization phase angle θ for better charging efficiency is continuously provided.

According to a preferred embodiment of the present invention, the outboard motor 1 includes the relay 3c provided between the generator 12 and at least one of the main battery 3a or the house battery 3b to switch between a state in which at least one of the main battery 3a or the house battery 3b is connected to the generator 12 and a state in which at least one of the main battery 3a or the house battery 3b is disconnected from the generator 12. Furthermore, the control circuit 13b continuously performs a control to retard or advance the energization phase angle θ before and after the number of batteries connected to the generator 12 is changed by the relay 3c when the output voltage value Va is lower than the first preset voltage value Vs1. Accordingly, even when the number of batteries connected to the generator 12 is changed by the operation of the relay 3c, the energization phase angle θ is continuously retarded or advanced, and thus the main battery 3a and the house battery 3b are efficiently charged regardless of a change in the number of batteries.

In the control method according to the various preferred embodiments of the present invention described above, the following advantageous effects are achieved.

According to a preferred embodiment of the present invention, even when power is supplied from the generator 12 to the main battery 3a and the house battery 3b, the main battery 3a and the house battery 3b are efficiently charged, similarly to the structure of the outboard motor 1.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the engine is preferably used as a drive engine in the preferred embodiments described above, the present invention is not restricted to this. For example, as the drive engine, an electric motor that generates a driving force with power may alternatively be used, or a hybrid system obtained by combining an engine and an electric motor may alternatively be used.

While the phase of the output voltage of the generated AC power is preferably acquired based on the information (signal) on the crank angle detected by the crank angle sensor in the preferred embodiments described above, the present invention is not restricted to this. For example, the phase of the output voltage of the generated AC power may alternatively be acquired based on a signal detected by a rotation angle sensor that detects the rotation angle of the rotor of the generator.

While two batteries (the main battery and the house battery) are preferably provided in the preferred embodiments described above, the present invention is not restricted to this. For example, three or more batteries may alternatively be provided.

While the main battery and house battery are preferably provided in the hull in the preferred embodiments described above, the present invention is not restricted to this. For example, at least one of the main battery or the house battery may alternatively be provided in the outboard motor.

While the energization phase angle is preferably first retarded and then advanced in the preferred embodiments described above, the present invention is not restricted to this. That is, the energization phase angle may alternatively be first advanced and then retarded.

While the energization phase angle is preferably retarded (advanced) a plurality of times by the unit angle until the output voltage value becomes equal to or higher than the first preset voltage value in the preferred embodiments described above, the present invention is not restricted to this. That is, the energization phase angle may alternatively be retarded or advanced only once such that the output voltage value becomes equal to or higher than the first preset voltage value.

While the energization phase angle is preferably advanced based on the output voltage value becoming equal to or higher than the second preset voltage value when the energization phase angle is retarded in the preferred embodiments described above, the present invention is not restricted to this. For example, the energization phase angle may alternatively be fixed to an angle at which the output voltage value becomes equal to or higher than the second preset voltage value based on the output voltage value becoming equal to or higher than the second preset voltage value. That is, both advancing and retarding may be stopped based on the output voltage value becoming equal to or higher than the second preset voltage value.

While two limit phase angles are preferably provided in the preferred embodiments described above, the present invention is not restricted to this. For example, the energization phase angle may alternatively be continuously retarded or advanced without providing at least one of the two limit phase angles.

While the energization phase angle is preferably advanced (retarded) based on the energization phase angle becoming the limit phase angle when the energization phase angle is retarded (advanced) in the preferred embodiments described above, the present invention is not restricted to this. For example, the energization phase angle may alternatively be fixed to the limit phase angle when the energization phase angle is retarded (advanced). That is, both advancing and retarding may be stopped based on the energization phase angle becoming the limit phase angle.

While the relay is preferably provided in the outboard motor in the preferred embodiments described above, the present invention is not restricted to this. For example, the main battery and the house battery may alternatively be constantly connected to the generator without providing the relay in the outboard motor.

While the second preset voltage value is preferably set to the charge rated voltage values of the main battery and the house battery in the preferred embodiments described above, the present invention is not restricted to this. That is, the second preset voltage value may alternatively be set to a value other than the charge rated voltage values of the main battery and the house battery.

While the battery controller and the relay are preferably provided in the outboard motor in the preferred embodiments described above, the present invention is not restricted to this. For example, the battery controller and the relay may alternatively be provided in the hull.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   a drive engine;
   a generator to generate power by operation of the drive engine;
   a power converter to convert AC power generated by the generator into DC power and to supply converted DC power to a plurality of batteries;
   a voltage detector to detect a voltage value of the DC power converted by the power converter; and
   a phase angle controller configured or programmed to perform a retarding/advancing control to retard or advance an energization phase angle, which is an energization timing with respect to a phase of an output voltage of the AC power generated by the generator; wherein
   the phase angle controller is configured or programmed to continuously perform the retarding/advancing control until the voltage value of the DC power becomes equal to or higher than a first preset voltage value, which is higher than a voltage value at a start of the retarding/advancing control, even when the voltage value of the DC power is decreasing.

2. The outboard motor according to claim 1, wherein the phase angle controller is configured or programmed to perform a control to retard or advance the energization phase angle a plurality of times by a predetermined angle until the voltage value of the DC power becomes equal to or higher than the first preset voltage value.

3. The outboard motor according to claim 1, wherein the phase angle controller is configured or programmed to perform a control to perform one of retarding and advancing the energization phase angle when the voltage value of the DC power is lower than the first preset voltage value, and stop at least one of retarding or advancing the energization phase angle based on the voltage value of the DC power becoming equal to or higher than the first preset voltage value and equal to or higher than a second preset voltage value.

4. The outboard motor according to claim 1, wherein the phase angle controller is configured or programmed to perform one of retarding and advancing the energization phase angle when the voltage value of the DC power is lower than the first preset voltage value, and to perform the other of retarding and advancing the energization phase angle based on the voltage value of the DC power becoming equal to or higher than the first preset voltage value and equal to or higher than a second preset voltage value.

5. The outboard motor according to claim 4, wherein the phase angle controller is configured or programmed to perform a control to perform again the one of retarding and advancing the energization phase angle based on the voltage value of the DC power becoming lower than the second preset voltage value when performing the other of retarding and advancing the energization phase angle.

6. The outboard motor according to claim 3, wherein the second preset voltage value is a charge rated voltage value of the plurality of batteries.

7. The outboard motor according to claim 1, wherein the phase angle controller is configured or programmed to perform a control to stop at least one of retarding or advancing the energization phase angle when the voltage value of the DC power is lower than the first preset voltage value, when one of retarding and advancing the energization phase angle is performed, and when the energization phase angle becomes a first limit phase angle.

8. The outboard motor according to claim 1, wherein the phase angle controller is configured or programmed to perform a control to stop one of retarding and advancing the energization phase angle and perform the other of retarding and advancing the energization phase angle when the voltage value of the DC power is lower than the first preset voltage value, when the one of retarding and advancing the energization phase angle is performed, and when the energization phase angle becomes a first limit phase angle.

9. The outboard motor according to claim 8, wherein the phase angle controller is configured or programmed to perform a control to perform again the one of retarding and advancing the energization phase angle when the voltage value of the DC power is lower than the first preset voltage value, when the other of retarding and advancing the energization phase angle is performed, and when the energization phase angle becomes a second limit phase angle.

10. The outboard motor according to claim 1, further comprising:
    a relay provided between the generator and at least one of the plurality of batteries to switch between a state in which the at least one of the plurality of batteries is connected to the generator and a state in which the at least one of the plurality of batteries is disconnected from the generator; wherein
    the phase angle controller is configured or programmed to continuously perform a control to retard or advance the energization phase angle before and after a number of the batteries connected to the generator is changed by the relay when the voltage value of the DC power is lower than the first preset voltage value.

11. A control method for an outboard motor including a generator to generate power by operation of a drive engine, the control method comprising:
    converting AC power generated by the generator into DC power and supplying converted DC power to a plurality of batteries;
    detecting a voltage value of the DC power; and
    performing a retarding/advancing control to retard or advance an energization phase angle, which is an energization timing with respect to a phase of an output voltage of the AC power generated by the generator; wherein
    the performing of the retarding/advancing control includes continuously performing the retarding/advancing control until the voltage value of the DC power becomes equal to or higher than a first preset voltage value, which is higher than a voltage value at a start of the retarding/advancing control, even when the voltage value of the DC power is decreasing.

12. The control method for an outboard motor according to claim 11, wherein the performing of the retarding/advancing control includes retarding or advancing the energization phase angle a plurality of times by a predetermined angle until the voltage value of the DC power becomes equal to or higher than the first preset voltage value.

13. The control method for an outboard motor according to claim 11, wherein the performing of the retarding/advancing control includes performing one of retarding and advancing the energization phase angle when the voltage value of the DC power is lower than the first preset voltage value, and stopping at least one of retarding or advancing the energization phase angle based on the voltage value of the DC power becoming equal to or higher than the first preset voltage value and equal to or higher than a second preset voltage value.

14. The control method for an outboard motor according to claim 11, wherein the performing of the retarding/advancing control includes performing one of retarding and advancing the energization phase angle when the voltage value of the DC power is lower than the first preset voltage value, and performing the other of retarding and advancing the energization phase angle based on the voltage value of the DC power becoming equal to or higher than the first preset voltage value and equal to or higher than a second preset voltage value.

15. The control method for an outboard motor according to claim 14, wherein the performing of the retarding/advancing control includes performing a control to perform again the one of retarding and advancing the energization phase angle based on the voltage value of the DC power becoming lower than the second preset voltage value when the other of retarding and advancing the energization phase angle is performed.

16. The control method for an outboard motor according to claim 13, wherein the second preset voltage value is a charge rated voltage value of the plurality of batteries.

17. The control method for an outboard motor according to claim 11, wherein the performing of the retarding/advancing control includes stopping at least one of retarding or advancing the energization phase angle when the voltage value of the DC power is lower than the first preset voltage value, when one of retarding and advancing the energization phase angle is performed, and when the energization phase angle becomes a first limit phase angle.

18. The control method for an outboard motor according to claim 11, wherein the performing of the retarding/advancing control includes stopping one of retarding and advancing the energization phase angle and performing the other of retarding and advancing the energization phase angle when the voltage value of the DC power is lower than the first preset voltage value, when the one of retarding and advancing the energization phase angle is performed, and when the energization phase angle becomes a first limit phase angle.

19. The control method for an outboard motor according to claim 18, wherein the performing of the retarding/advancing control includes performing again the one of retarding and advancing the energization phase angle when the voltage value of the DC power is lower than the first preset voltage value, when the other of retarding and advancing the energization phase angle is performed, and when the energization phase angle becomes a second limit phase angle.

20. A marine vessel comprising:
a plurality of batteries; and
an outboard motor connected to the plurality of batteries; wherein
the outboard motor includes:
 a drive engine;
 a generator to generate power by operation of the drive engine;
 a power converter to convert AC power generated by the generator into DC power and to supply converted DC power to the plurality of batteries;
 a voltage detector to detect a voltage value of the DC power converted by the power converter; and
 a phase angle controller configured or programmed to perform a retarding/advancing control to retard or advance an energization phase angle, which is an energization timing with respect to a phase of an output voltage of the AC power generated by the generator; and
the phase angle controller is configured or programmed to continuously perform the retarding/advancing control until the voltage value of the DC power becomes equal to or higher than a first preset voltage value, which is higher than a voltage value at a start of the retarding/advancing control, even when the voltage value of the DC power is decreasing.

* * * * *